Sept. 2, 1947.  N. C. PRICE ET AL  2,426,746
APPARATUS FOR WELDING VANES TO TURBINE ROTORS
Original Filed March 20, 1944  3 Sheets-Sheet 1
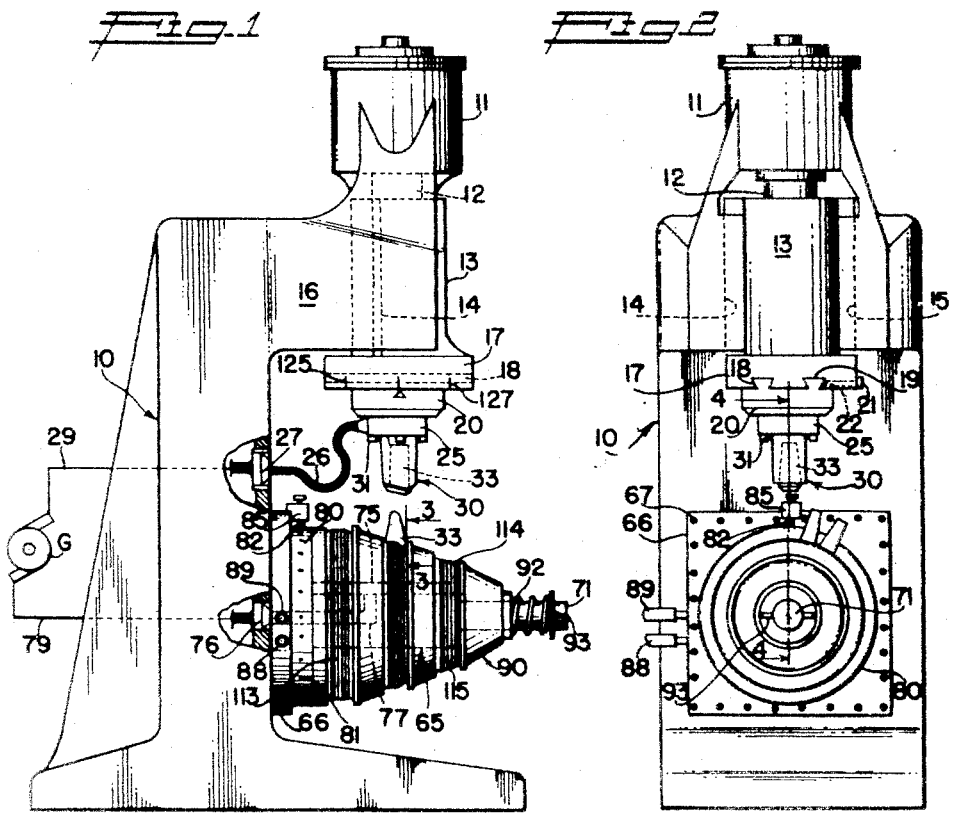
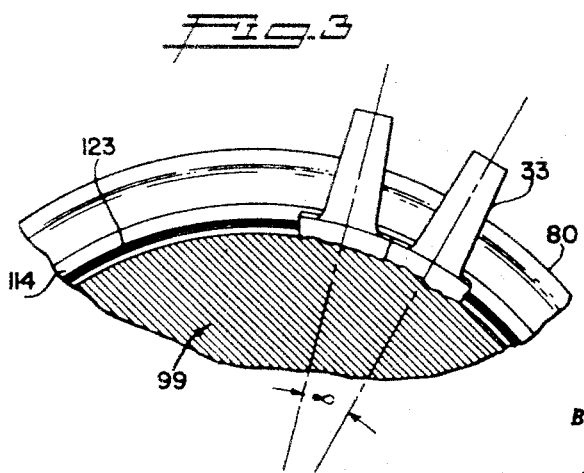
INVENTORS
NATHAN C. PRICE
HAROLD A. GREENWALD
BY
George C. Sullivan
Agent

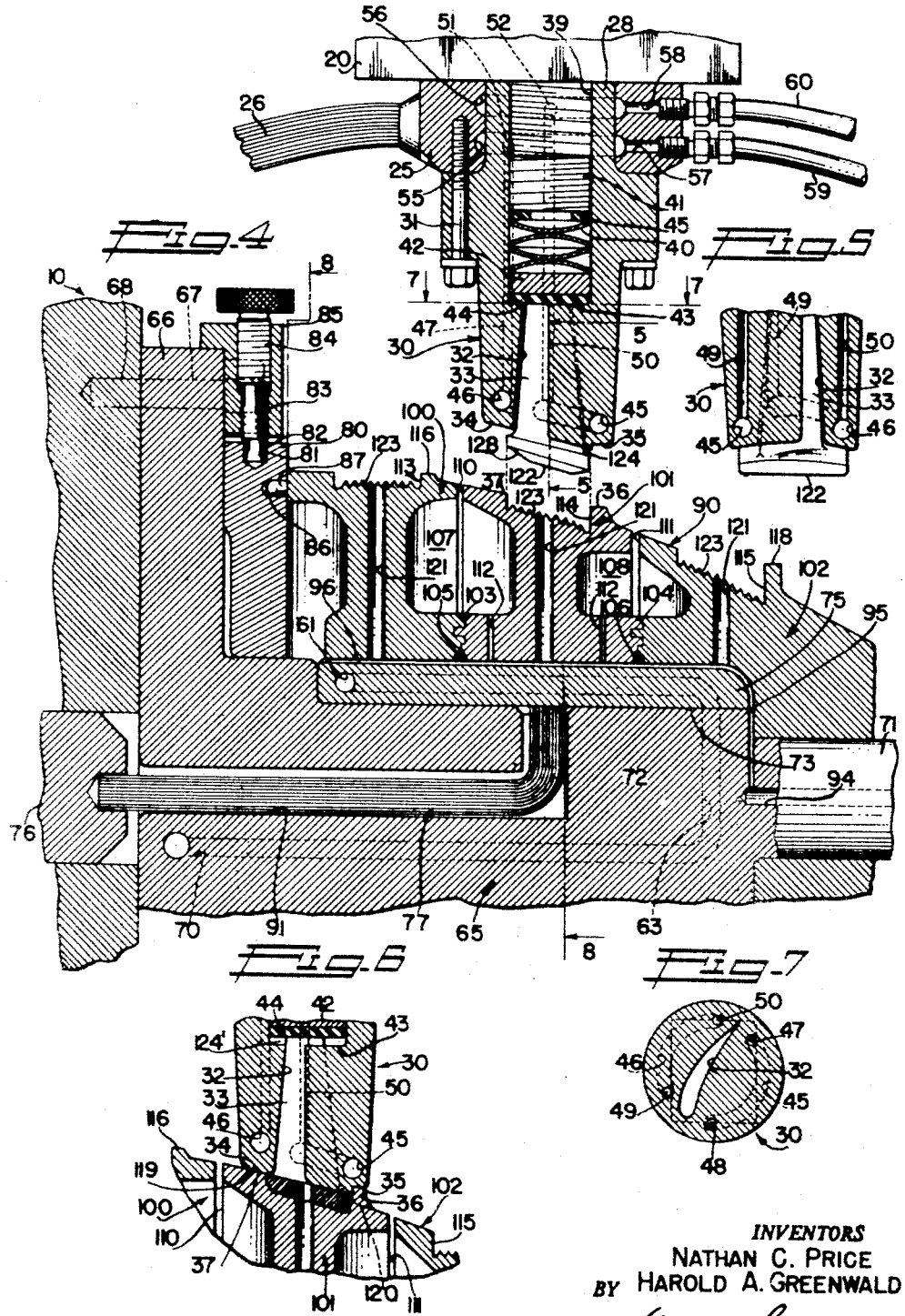

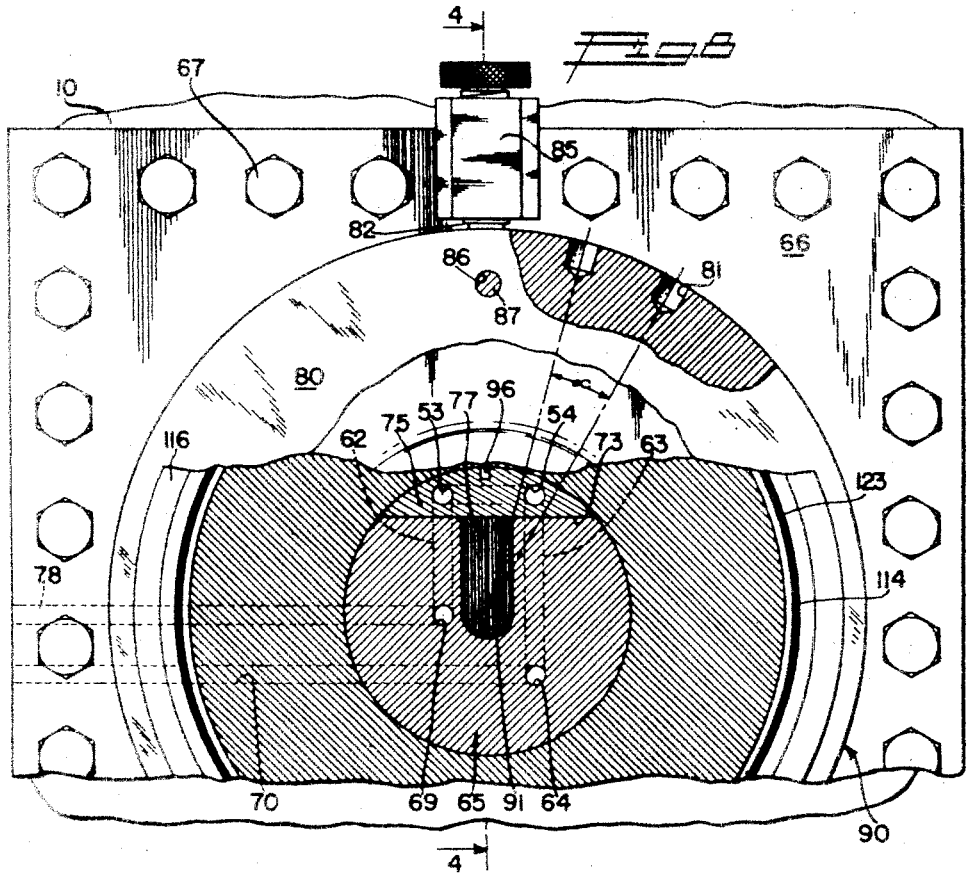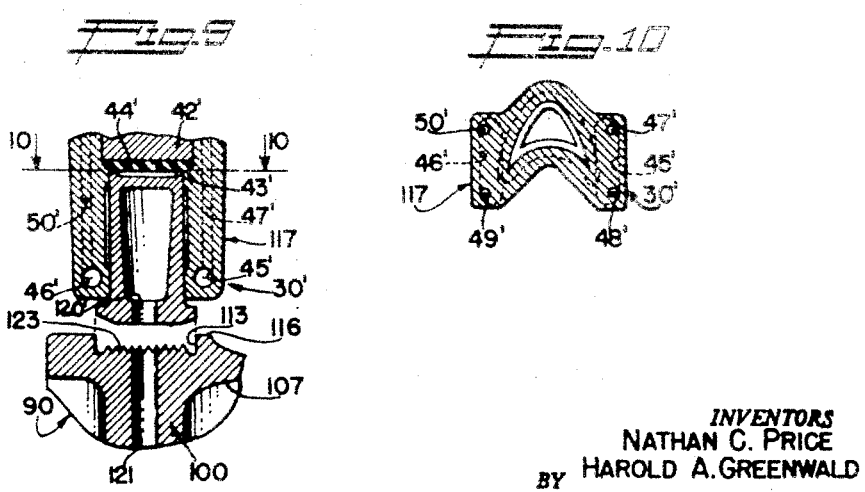

Patented Sept. 2, 1947

2,426,746

UNITED STATES PATENT OFFICE 2,426,746

APPARATUS FOR WELDING VANES TO TURBINE ROTORS

Nathan C. Price, Hollywood, and Harold A. Greenwald, West Los Angeles, Calif., assignors to Lockheed Aircraft Corporation, Burbank, Calif.

Original application March 20, 1944, Serial No. 527,306. Divided and this application June 22, 1945, Serial No. 600,898

14 Claims. (Cl. 219—4)

This invention relates to an apparatus for fabricating turbine rotors and similar elements, and relates more particularly to the fabrication of turbine rotors of the drum type carrying pluralities of buckets or vanes.

This application is a division of application, Serial No. 527,306, filed March 20, 1944.

The present invention has manifold adaptations and finds one important application in the construction of axial flow gas turbines designed to operate under temperature and speed conditions much more severe than those heretofore encountered in gas turbine practice. In addition to the fabrication of turbine rotors for use under high temperature conditions, the invention is particularly well adapted to the construction of high temperature gas turbine rotors and high speed axial flow compressor rotors for gas turbine power plants designed to operate at speeds substantially in excess of those heretofore conventionally employed.

Turbine and compressor rotors have usually consisted of a central spindle or drum carrying a multiplicity of radially projecting vanes or blades attached to the drum by different attachment means. The vanes or blades are usually attached to the central drum by bolts, keys, dovetails, or like attaching means. These conventional modes of attachment were, even under moderate temperature and speed conditions, subject to becoming loosened and lacked rigidity and strength. Furthermore, the vanes or blades were frequently broken due to the critical vibrational characteristics permitted by the inadequate attachment means. The blade attaching means heretofore employed also required extensive machining of both the drum and the blades, and necessitated complicated fitting operations to obtain satisfactory connections.

It is, therefore, an object of this invention to provide a simple, rapid and practical apparatus for the fabrication of turbine and compressor rotors for high speed, high temperature gas turbine power plant service.

It is another object of the invention to provide an apparatus for fabricating rotors capable of operating at higher temperatures and higher speeds than the rotors heretofore employed in the elastic fluid turbine art.

The objects of this invention are attained in general, by forming a built-up turbine drum having one or more coaxially joined annular sections adapted to be mounted on a shaft, each such section carrying a row of circumferentially spaced, radially positioned impeller blades resistance welded to its periphery, forming in effect, a homogeneous unitary rotor body. These and other objects and features of novelty will become evident hereinafter in the description, which, together with the following drawings, illustrate preferred embodiments of the invention.

Figure 1 is a side elevational view of the general assembly of the apparatus of this invention.

Figure 2 is a front elevational view of the apparatus of Figure 1.

Figure 3 is a fragmentary cross-sectional view taken on line 3—3 of Figures 1 and 4.

Figure 4 is a fragmentary longitudinal cross-sectional view taken on line 4—4 of Figures 2 and 8.

Figure 5 is a fragmentary sectional elevation taken on line 5—5 of Figure 4.

Figure 6 is a fragmentary cross-sectional view of the rotor showing the impeller blade of Figure 4 after attachment to the drum.

Figure 7 is a cross-sectional view of the blade holder taken on line 7—7 of Figure 4.

Figure 8 is a cross section of the apparatus taken on line 8—8 of Figure 4.

Figure 9 is a fragmentary cross-sectional view of an alternative type of impeller blade and impeller blade holder employable in the apparatus of Figure 4.

Figure 10 is a cross-sectional view taken on line 10—10 of Figure 9.

Referring now to the drawings in which like reference numerals refer to corresponding parts throughout the several figures, the apparatus of the invention is as follows:

In Figure 1, 10 is the yoke or frame of an electric welding press, supporting at the top a pneumatic or hydraulic cylinder 11. A piston rod 12 extending from the lower end of the cylinder 11, makes connection with a crosshead 13, which is reciprocably retained between opposite vertical guides 14 and 15 formed in the outer portion of the upper arm 16. A ram plate 17 is carried on the lower end of the crosshead 13. The ram plate 17 is provided with a pair of dovetails 18 and 19 by means of which an electrode holder rest 20 is supported thereunder with freedom for lateral adjustment fore and aft with respect to the vertical axis of the piston 12 and crosshead 13. Suitable means such as a set-screw 21 threaded through the side of the ram plate 17 and acting against a wedge plate 22 in contact with one of the dovetail elements 19 serves adjustably to lock the electrode holder member 20 in position against lateral movement.

On the lower face of the electrode holder rest 20, and forming a part thereof, is an electrode retaining ring or socket 25 which may be welded or bolted to the lower face of the said electrode holder member 20. The socket 25 is preferably made of a strong material which is a good electrical and heat conductor, such as copper alloyed with small quantities of strengthening elements such as beryllium or tungsten, of the type widely employed in connection with electric welding apparatus. A heavy flexible conductor lead 26, preferably formed of a plurality of thin copper laminations, serves as an electrical connection between the electrode holder ring 25 and a stationary connector terminal 27 located in the inner face of the machine frame 10 and suitably insulated therefrom. The terminal 27 is in turn connected through a suitable electrical conductor 29 with one side of a suitable high amperage source of electrical current such as a transformer or a generator as illustrated at G.

Referring now primarily to Figure 4, 30 is a special electrode, the shank 28 of which is adapted to be plugged into the electrode socket ring 25 and retained in place in good electrical and fluid-tight contact therewith by means of a plurality of circumferentially spaced flange bolts as shown at 31. The lower end portion of the electrode 30 opposite the shank 28, is formed with an approximately coaxially located cavity extending inwardly from the lower end and having a surface contour, as illustrated at 32, which closely conforms with the exterior surface contour of an impeller blade to be retained therein as shown at 33. The lower end of the impeller blade retaining electrode 30 surrounding the electrode retaining cavity is formed with saddle surfaces as shown at 34 and 35, adapted in operation to be congruous on one side with the contour of an integral guide ring 36 and on the opposite side with the surface contour at 37 of the turbine rotor drum to which the blade is to be welded for accurately determining the position of the electrode 30 and the impeller blade 33 during the welding cycle as hereinafter more fully described.

The shank 28 of the impeller retaining electrode 30 is provided with a bore 39 containing a series of a plurality of Bellville spring elements as shown at 40 adapted to act under compression against a threaded, adjustable plug 41 and a pressure disc 42. The pressure disc 42 normally rests, under the force of the spring 40, against an annular shoulder 43 in the electrode 30, but the annular shoulder 43 is located in such an axial position that in order to fully insert an impeller blade such as that shown at 33, the pressure disc must be lifted off the shoulder and forced inwardly a short distance against the force of springs 40. In operation, pressure may thus be brought to bear upon the tip of said impeller blade 33 by means of the pressure disc 42 acting through a suitable insulating pad 44. An insulating ring 45 is also provided between the innermost Bellville spring element and the inner face of the adjustable screw 41. The insulating washer 45 and the insulating pad 44, which may be of any suitable material such as mica, fibre, rubber, or plastic, serve primarily to prevent flow of any portion of the heavy welding current through the spring elements 40.

Cooling ducts are provided within the impeller blade retaining electrode 30. The arrangement of the cooling ducts will vary as required by the shapes of the impeller blades to be accommodated. In an electrode as shown at 30 in Figures 4, 5 and 6, a pair of semi-circular ducts 45 and 46 are provided within the end portion of the electrode on either side of the impeller blade root adjacent the welding area, as best shown in Figure 7. Suitable inlet and outlet passages 47, 48, 49 and 50, leading to these semi-circular cooling ducts extend lengthwise through the electrode walls and communicate with suitable lateral inlet and outlet apertures in the shank, two of which are shown at 51 and 52 in Figure 4. These apertures register with a pair of annular recesses 55 and 56 in the electrode retaining ring 25, and they in turn make connection through ducts 57 and 58 with flexible tubes 59 and 60 which lead to a suitable source of circulating coolant fluid.

A horizontally positioned drum supporting hub 65 is supported on the inner face of the frame 10 in lateral alignment with the axis of the electrode 30 by means of an integral attachment plate 66. A plurality of bolts 67 which pass through holes in the margin of the attachment plate 66 are threaded into the inner face of the supporting frame as best shown at 68 in Figure 4. The hub 65 is provided with an outer axial shaft portion 71 and an intermediate electrode supporting section 72. The upper surface of the intermediate section 72 of the hub 65 is provided with a flat surface as best shown at 73 in Figure 8, upon which is fixed an electrode 75 having the form of a circular segment as viewed in cross section, so that the adjoining outer surfaces of the hub 72 and of the electrode 75 form a cylinder adapted to fit closely within the inner bore of a turbine rotor drum as hereinafter more fully described. Electrode 75 is preferably made of a material which is a good electrical conductor, such as copper, or most preferably, tungsten copper or beryllium copper alloy of the type widely employed in connection with electric welding equipment. A heavy electrical conductor 77, preferably formed of a plurality of copper strands, interconnects the intermediate portion of the electrode 75 with a terminal block 76 by way of a centrally located bore 91 extending rearwardly through the hub 65 to the terminal block 76 retained within the frame 10. The terminal block 76 is in turn connected through a suitable conductor 79 to the other side of the hereinbefore mentioned suitable source of current G.

The electrode 75 and the hub 65 are provided with longitudinal cooling ducts. The ducts 53 and 54 in the hub are joined at one end by a bend 61 and at the opposite ends they make connection with the lateral passages 62 and 63 in the hub, which in turn lead out of the hub through passages 64 and 69 and thence through the attachment plate 66 through passages 70 and 78 to external circulating coolant connections, as shown at 88 and 89 in Figure 2.

The inner end of the hub 65 is adapted rotatably to support an indexing disc adjacent the attachment plate 66 as shown at 80. The indexing disc 80, which may be of any suitable thickness required properly to locate the turbine rotor drum axially upon the hub 65, is provided with a plurality of equally spaced indexing holes which may be placed either in the exposed marginal portion of the face of the disc or as illustrated herein, located in the periphery. These indexing holes, as shown at 81, are spaced so as to subtend angles α, equal to that subtended by the radial axes of the turbine impeller blades as best shown in Figures 3 and 8. An adjustable detent 82 having a conical end and adapted to enter and center itself within each of the indexing holes 81, as illustrated in Figure 4, serves to determine and retain the indexing disc 80 at the predetermined increments of angular rotation α as controlled by the spacing of the indexing holes 81. The indexing pin 82 guided at 83 is adjustable radially by means of threads 84 in bracket 85, which overhangs the periphery of the indexing disc 80 and is rigidly joined to the upper edge of the attachment plate 66 by suitable means such as gas or electric welding.

The outer face of the indexing disc 80 is provided with a drilled coordinating hole, as shown at 86, into which a coordinating pin 87 is adapted to extend. The coordinating pin 87 may be temporarily attached to the adjacent inner edge of the turbine rotor drum by any suitable means such as welding, or preferably silver soldering in a furnace, and serves as a means to rotationally couple the said turbine rotor drum in a fixed reference position with respect to the indexing disc 80.

Referring now primarily to Figures 1 and 4, a turbine rotor drum 90 is shown supported upon the hub 65 and bearing upon the electrode 75. The drum 90 is retained in axial position and in forceful engagement with the indexing disc 80 by means of a helical spring 92 positioned on the outer extending end of the shaft 71. The spring acts under compression between the outer end of the turbine rotor drum and a pin 93 positioned through the outer end of the shaft. The shaft 71 and hub 65 may be of any other desired form best adapted to support the electrode 75 and to fit the inside contour of the bore of the particular type and shape of rotor drum to which blades are to be welded. The corresponding inside shape of the rotor drum bore need not necessarily conform to that which it will have in its finished condition.

Shaft 71 may be provided with an axial duct 94 leading to a radial passage 95, which in turn connects with a longitudinal vent groove as shown at 96, formed in the contacting surface of the electrode 75.

The turbine rotor drum is preferably constructed of a plurality of contiguous, coaxial annular shaped sections of differing average outer diameters, which for convenience is herein illustrated as having three sections, as shown at 100, 101, and 102 joined together at their inner peripheries by arc or gas welding as indicated at 105 and 106 to form a body having a smooth, substantially continuous conoidal outer surface which is to constitute the inner flow channel boundary of the turbine expansion zone. The said sections 100, 101, and 102 are coupled in end-to-end coaxial alignment prior to welding by means of the plurality of concentric, complementary coordinating rings and grooves as shown at 103 and 104. Any desired number of such rotor sections may be employed in building up the rotor, depending upon the length, form, and number of rows of blades desired.

The before mentioned sections, 100, 101 and 102, of the turbine rotor drum are preferably formed with annular concavities on opposite faces which, as assembled together adjacent to one another, form annular cavities intermediate the inner and outer peripheries as shown at 107 and 108. The outer opposite flange portions of adjacent rotor drum sections are preferably separated, as shown at 110 and 111, by narrow annular expansion joints. Unequal expansion between the inner and outer peripheries of the drum is thus provided for to eliminate thermal stresses, and a path for circulation of a cooling fluid, such as air, is provided from the inner to the outer surface of the turbine drum, for example, by way of suitable ducts such as shown at 112.

On the outer conoidal surface of the drum and preferably symmetrically located with respect to the web of the cross section of each drum section, insofar as it is possible, annular channels are formed as shown at 113, 114 and 115, preferably of a width substantially equal to that of the impeller blade root or base to be attached therein. These grooves are preferably formed with a plurality of circumferential serrations turned in the bottom surfaces thereof, as shown at 123, for the purpose of presenting an initial, reduced area of contact with the inner tapered end of the impeller blade root at the initiation of the welding cycle as hereinafter more fully described. Guide rings as shown at 116, 36 and 118, are also preferably integrally formed on the lower edges of the grooves 113—115, particularly on those which have a considerable slope with respect to the axis of the rotor drum to serve as a means for preventing the tendency of the electrode to slide downwardly along the surface of the groove while being subject to welding force during the welding cycle. The guide rings 116, 36, and 118, also serve the more important function of providing a reference surface upon which the saddle ends 34 and 35 of the electrode 30 are adapted to fit and seat during the welding cycle to accurately determine the depth to which the impeller blades are forced into the rotor drum welding groove during the welding cycle. The impeller blade roots are preferably beveled on the underneath surface as shown at 128 to present an initial reduced area of contact with the welding groove serrations and to provide space for molten metal to flow and thus minimize extrusion thereof which would otherwise occur at the edges, to cause interference with the next adjacent blade to be welded. When the welding of the rows of the impeller blades in the welding grooves of the various sections of the rotor drum has been completed, the guide rings 116, 36, and 118 are then partially removed by turning them down in a suitable lathe to a form approximately indicated by the dotted line shown at 120 in Figure 6 to form a step or corner fillet joining the upper surface of the impeller blade roots with the adjacent surface of the drum. The turbine rotor and blade assembly described above forms the subject matter of our copending application Serial No. 527,308.

As stated hereinbefore, the impeller blade-retaining electrode 30 is formed with an end cavity which accurately conforms with the outer surface contour of the impeller blade to be retained, but the outside surface of the electrode may take any suitable form as determined by the size and shape of the impeller blade or turbine bucket to be contained and which at the same time will provide adequate clearance with adjacent impeller blades previously welded in place in the rotor drum welding groove. In cases where the impeller blades are airfoil shaped, as illustrated in Figures 4 to 7 inclusive, the electrode may be substantially cylindrical in shape, as best shown in Figure 7. However, with other types and shapes of impeller blades, for example, with an impulse bucket of the type shown at 117 in Figures 9 and 10, the blade-retaining end of the electrode 30' may have to be formed in order to accommodate this shape of impeller bucket and provide for necessary clearance with the adjacent previously attached impulse bucket.

The shank 28 of the impeller blade retaining electrode may be standardized for all types of blade retaining electrodes in order to be interchangeably adaptable to plug into the electrode retaining ring 25. In some cases where the impeller blade has considerable twist throughout its length, it may be necessary to construct the retaining electrode split longitudinally to form two halves which may be separated to allow the inserting and withdrawal of the impeller blade.

The impeller blades and buckets may, as illustrated in Figure 9, be provided with cooling passages or vents 120' through their roots which are adapted to register with corresponding passages 121 extending radially through the drum sections.

The operation of the apparatus of the invention is as follows: An indexing disc 80 of the required thickness and having peripheral indexing holes 81 of the required number and spacing corresponding with the size and spacing of turbine impeller blades to be welded in place in one of the annular welding channels, for example, the one shown at 114 in Figure 4, is placed over the hub 65 and seated against the forward face of the attachment plate 66. The prefabricated rotor drum comprising the sections 100, 101, and 102, is next placed upon the hub 65 and forced into engagement with the face of the indexing disc 80 by means of the spring 92, which in turn is placed in position on the outer end of the shaft 71 and retained under the required compression by means of pin 93. Upon installation of the turbine motor drum as just mentioned, the coordinating pin 87, previously attached at any suitable arbitrary point on the rim of the rotor, is inserted in place in the indexing hole 86 in the indexing disc 80. The rotor drum and indexing disc 80 are next rotated together to a position of registry between the indexing pin 82 and one of the peripheral indexing holes 81, after which the indexing pin or detent 82 is seated firmly in place in the indexing hole by means of threads 84. The turbine rotor drum is thus adjusted to and locked in a suitable position in readiness for the initial welding of a turbine impeller blade in the welding groove 114 as illustrated in Figure 4.

An impeller blade which is to be welded in place on the rotor drum is inserted into the lower blade-retaining portion 30 of the electrode, and lowered therewith into welding position against the serrations in the bottom of the electrode welding groove and suitable welding force applied by means of fluid pressure in the cylinder 11 acting through piston rod 12, crosshead 13, and the ram and rest plates 17 and 20. Upon initial contact of the lower end 122 of the blade root against the tips of the serrations 123 in the welding groove 114, the impeller blade 33 is forced upward by the resultant reaction into snug engagement with the inner surface 32 of the electrode against the pressure of the accompanying upward movement of plate 42 and springs 40. The narrow gap initially present between the lower end of the electrode and the upper surface of the impeller blade root shown at 124 is thus closed and the pressure plate 42 displaced inwardly a corresponding distance 124' against the spring 40, as shown in Figure 6, which results in an initial compressive force being applied axially through the impeller blade body. The distance 124' generally does not exceed .008" per inch of blade length, which is greater than the dimensional tolerance in blade manufacture. The electrode pressure in excess of that which is exerted axially through the impeller blade by means of the pressure plate 42 is received by the flange of the impeller blade root and thus the total welding force applied between the drum and the electrode is divided between the flange and the body of the impeller blade. The purpose of thus dividing the welding pressure is to reduce the maximum stress which must be imposed upon any one portion in the impeller blade. Danger of damaging or collapsing relatively thin, hollow blades is thus reduced, and the flange of the impeller blade is protected from cracking by bending stresses during fusion.

Sufficient current is next passed through the point of contact between the impeller blade root and the drum by way of the electrodes 30 and 75 and the conductors 26, 29 and 77, 79 for fusion of the interface between the bottom 122 of the impeller blade root and the serrations 123 of the welding groove. As the fusion progresses, the electrode 30 carrying the impeller blade 33 lowers under the welding force until the saddle surfaces 34 and 35 meet and rest upon the upper surfaces 36 and 37 of the guide ring and the rotor drum surface respectively, as shown at 119 in Figure 6. At this point of time at the end of the welding cycle, the welding current is cut off, and after a brief forging delay period of time during which cooling takes place, the electrode 30 is retracted leaving the impeller blade welded in position on the drum as illustrated in Figure 6.

After the first impeller blade has been thus welded in place, the indexing detent 82 is removed from the corresponding indexing hole, the drum together with the indexing disc is rotated through an angle α to the location of the next adjacent indexing hole in the periphery of the indexing disc, and the indexing disc detent 82 again introduced and tightened therein by means of the threads 84 to determine the next position for welding of another impeller blade in place in a position adjacent to the first impeller blade. The steps just described are repeated successively for each impeller blade until all of the impeller blades in a given row are welded in place.

After completion of welding of all of the impeller blades in any given row, the electrode rest 20 may be moved inward or outward parallel to the rotor drum axis into position as indicated by the indexing lines 125 or 127 to an alignment with the next rotor section welding groove. After installing the proper impeller blade retaining electrode in the holder 25, adapted to retain the type and size of electrodes for welding that particular row, the hereinbefore described welding cycles are repeated for each impeller blade until that row of impeller blades has also been welded in place.

For each row of impeller blades thus welded in place on the rotor drum, a separate indexing disc 80 is usually employed which has the required number and spacing of indexing holes in its periphery as determined by the number and angular spacing of the impeller blades in that particular row. Instead of depending entirely upon adjustment of the impeller blade retaining electrode holder rest 20 upon the ram plate 17, as hereinbefore mentioned, indexing discs of suitable thickness may be alternatively employed to position the rotor drum axially upon the hub 65 in the desired welding positions. Thus a number of indexing discs corresponding to the number of rows of impeller blades to be welded in place may be employed, each of different thickness and having a different number of equally spaced indexing holes in their periphery.

During the welding cycle, a suitable coolant such as water is circulated through the ducts in the electrodes 30 and 75 by way of the connections 59, 60 and 88, 89 hereinbefore described.

In the welding cycle an electrode pressure varying generally from approximately 1,200 to 3,000 pounds is employed for impeller blade root areas of approximately .20 square inch. The maximum current value required under this condition varies from approximately 50,000 to 60,000 amperes at the peak current portion of the welding cycle.

For example, a typical welding cycle suitable for the resistance welding of the impeller blades, in accordance with this invention, comprises the steps of first applying an initial pre-forging force between the blade root and drum of approximately 1,200 to 1,500 pounds for a period of time corresponding to five cycles of a sixty-cycle heating current, followed by an increased force of approximately 2,400 to 3,000 pounds for forging the heated area of the weld during the following remaining one cycle period of heating time, and then holding this forging force for an additional period of time corresponding to that from the sixth to approximately the sixteenth alternating current cycle, after which the pressure is removed and the weld allowed to cool. The heating current is applied during the five-cycle pre-forging time and continues for approximately one-cycle during application for the initial forging pressure. It has a value, as before stated, of approximately 50,000 to 60,000 amperes. Some variation of these welding cycle values may be made by those skilled in the art, without departing from the invention, to suit the particular welding conditions which may vary with size of parts and materials employed.

Advantages accruing from the invention are better stress distribution in the base of the blade and in the drum to which it is attached, more efficient use of the drum material which results in reduced stresses in the drum or makes it possible to employ a lighter drum, and improved rigidity and freedom from vibration in the blades resulting in freedom from blade failure. The heat conduction from the blade to the drum is higher with the construction of the present invention than with conventional attachment methods, which results in better cooling of the most highly stressed portions of the blade. The blades can thus be run at higher average temperatures. Also, the impeller blades can be more accurately and rapidly attached to the drum without having to employ elaborate machining operations to both blades and drum to form the joints, as has heretofore been necessary. The drum material is used to greater advantage since there is no inactive material between the blades tending to unnecessarily raise the rotor stresses as is the case in conventional designs.

While the hereinbefore described apparatus, as illustrated herein, is particularly well adapted to the precision construction of high temperature, high speed gas turbine rotors subject to severe service conditions, the apparatus may be similarly and advantageously employed in connection with the fabrication of gas turbine stators which include stationary blading. Also, the fabrication problems of axial flow compressors which utilize blading of the airfoil type operating at high speed and high temperature resulting from heat of compression, are very similar to that of gas turbines. The foregoing descriptions and following claims are therefore intended to include and be applicable to axial flow compressors for elastic fluids, wherein like advantages accrue from the invention.

It is to be understood that the foregoing is not to be limiting but may include any and all forms of apparatus included within the scope of the claims.

We claim:

1. Apparatus for constructing rotors comprising in combination, means for rotatably supporting a rotor drum, adjustable means for fixing said drum in predetermined angular positions upon said supporting means, means associated with said supporting means for retaining an impeller blade, cylinder and piston means for moving said retaining means and impeller blade radially with respect to said supporting means whereby an impeller blade root may be pressed in forceful contact with the rotor drum on said supporting means, and means to pass an electric welding current between said supporting means and said impeller blade retaining means.

2. Apparatus for constructing rotors comprising in combination, means for rotatably supporting a rotor drum, adjustable means for fixing said drum in predetermined angular and axial positions upon said supporting means, means associated with said supporting means for retaining and moving an impeller blade radially with respect to said supporting means whereby the root of the impeller blade may be pressed in forceful contact with a predetermined point on the rotor drum on said supporting means, means to pass an electric welding current between said supporting means and said impeller blade retaining means, and means for terminating the inward radial deflection of the blade when a predetermined deflection has been effected.

3. Apparatus for constructing turbine rotors comprising in combination, a support having means for rotatably supporting a rotor drum, an electrode forming a part of said support and adapted to contact an inside surface of a drum supported thereon, adjustable means for fixing said drum in predetermined angular positions upon said supporting means, means associated with said supporting means for retaining and moving an impeller blade radially with respect to said supporting means, an electrode associated with the last named means and shaped to retain an impeller blade whereby an impeller blade root may be pressed in forceful contact with a rotor drum on said supporting means, and means to pass an electric welding current between said supporting means electrode and said impeller blade retaining means electrode.

4. Apparatus for constructing turbine rotors comprising in combination, a support having means for rotatably supporting a rotor drum, an electrode forming a part of said support and adapted to contact an inside surface of a drum supported thereon, adjustable means for fixing said drum in predetermined angular positions upon said supporting means, means associated with said supporting means for retaining and moving an impeller blade radially with respect to said supporting means, an electrode associated with the last named means and shaped to retain an impeller blade whereby an impeller blade root may be pressed in forceful contact with a rotor drum on said supporting means electrode and said impeller blade retaining means electrode, the last named electrode having a fluid passage in close proximity to the blade retained therein, and means to circulate cooling fluid through said passage.

5. Apparatus according to claim 4 in which said last named electrode comprises a rigid conductive member having a mating cavity in the end thereof adapted to receive and support the said impeller blade.

6. Apparatus according to claim 4 in which said last named electrode comprises a rigid conductive member having a mating cavity formed to receive and support a turbine impeller blade therein, and a seat on the end of said last named electrode adapted to rest upon a portion of the drum adjacent the point of impeller attachment to limit the inward movement and determine the radial position of the said last named electrode with respect to said drum at the termination of the welding cycle.

7. Apparatus according to claim 4 in which said last named electrode comprises a rigid conductive member having a mating cavity formed to conform to and support a turbine impeller blade therein, means in said member adapted to distribute welding cycle force between the tip and the root portion of an impeller blade contained therein, and a seat on the end of said last named electrode adapted to rest upon a portion of the drum adjacent the point of attachment to limit the inward movement and determine the radial position of the said last named electrode with respect to said drum following the welding cycle.

8. Apparatus according to claim 4 in which said last named electrode comprises a rigid conductive member having a cavity formed to conform to and support a turbine impeller blade therein; a compression spring in the shank of said electrode member, means to transmit compressive force from said spring to the end of an impeller blade contained therein and a seat on the end of said last named electrode adapted to rest upon a portion of the drum adjacent the point of impeller attachment to limit the inward movement and determine the radial position of the said last named electrode with respect to said drum following the welding cycle.

9. Apparatus for constructing turbine rotors in accordance with claim 1 in which the said adjustable means comprises an indexing disc carried on said rotor drum supporting means, means to couple said indexing disc to said drum, and a means cooperating with said disc and associated with said apparatus to indicate and fix said disc at predetermined angular positions with respect to said impeller blade retaining means.

10. Apparatus for constructing turbine rotors in accordance with claim 1 in which the said adjustable means comprises an indexing disc carrying a plurality of circumferentially arranged indexing means at angular positions corresponding to the predetermined included angle between the impeller blades to be attached to the drum, a detent associated with said supporting means and adapted to cooperate with said indexing means on said disc to fix said disc at the said predetermined angular positions on said supporting means.

11. Apparatus for constructing turbine rotors in accordance with claim 1 in which the means to fix said drum in predetermined axial position on said drum supporting means comprises a separable indexing disc of predetermined thickness positioned on said supporting means, means associated with said supporting means to limit axial movement of said disc, and means to retain a rotor on said supporting means in contact with said disc.

12. Apparatus for constructing turbine rotors comprising in combination, means for rotatably supporting a rotor drum, an electrode forming a part of said support and adapted to contact an inside surface of a drum supported thereon, adjustable means for fixing said drum in predetermined angular positions upon said supporting means, means associated with said supporting means for retaining and moving an impeller blade radially with respect to said supporting means, an electrode associated with said guide means and shaped to retain an impeller blade whereby an impeller blade root may be pressed in forceful contact with a rotor drum on said supporting means, an insulating pad in the electrode for engaging the tip of the blade, means for passing an electric welding current between said supporting means electrode and said blade retaining means electrode, and means for circulating cooling fluid through said electrode.

13. Apparatus for constructing turbine rotors comprising mandrel means for rotatably supporting a rotor drum, an axially extending electrode on the mandrel means for contacting the inside surface of the drum, means for setting the drum in predetermined angular positions on the mandrel means, carrier means movable radially relative to the drum, an electrode on the carrier means shaped to receive and retain an impeller blade whereby the root of the blade may be forcibly pressed against the drum, the last named electrode comprising a rigid conductive member having a mating cavity shaped to receive and conform to said blade, and means in the member for distributing welding cycle force between the tip and root portions of the blade.

14. Apparatus for constructing turbine rotors comprising mandrel means for rotatably supporting a rotor drum, an axially extending electrode on the mandrel means for contacting the inside surface of the drum, means for setting the drum in predetermined angular positions on the mandrel means, carrier means movable radially relative to the drum, an electrode on the carrier means shaped to receive and retain an impeller blade whereby the root of the blade may be forcibly pressed against the drum, the last named electrode comprising a rigid conductive member having a mating cavity shaped to receive and conform to said blade, means in the member for distributing welding cycle force between the tip and root portions of the blade, and an insulating element on the member for engaging an end portion area of the blade.

NATHAN C. PRICE.
HAROLD A. GREENWALD.

REFERENCES CITED

The following references are of record in the file of this patent:

UNITED STATES PATENTS

| Number | Name | Date |
|---|---|---|
| 969,260 | Ferrauti (1) | Sept. 6, 1910 |
| 1,233,688 | Murray et al | July 7, 1917 |

FOREIGN PATENTS

| Number | Country | Date |
|---|---|---|
| 574,566 | France | Apr. 2, 1924 |